United States Patent
Halter et al.

(10) Patent No.: US 11,783,042 B2
(45) Date of Patent: Oct. 10, 2023

(54) ACCESS CONTROL SYSTEM AND METHOD FOR ISOLATING MUTUALLY DISTRUSTING SECURITY DOMAINS

(71) Applicant: QUALCOMM INCORPORATED, San Diego, CA (US)

(72) Inventors: Steven Halter, San Diego, CA (US); Samar Asbe, San Diego, CA (US); Miguel Ballesteros, San Diego, CA (US); Girish Bhat, San Diego, CA (US); Mahadevamurty Nemani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 16/903,982

(22) Filed: Jun. 17, 2020

(65) Prior Publication Data

US 2021/0397714 A1    Dec. 23, 2021

(51) Int. Cl.
G06F 21/57    (2013.01)
G06F 9/445    (2018.01)
G06F 9/50    (2006.01)
G06F 21/62    (2013.01)

(52) U.S. Cl.
CPC ............ *G06F 21/575* (2013.01); *G06F 9/445* (2013.01); *G06F 9/5016* (2013.01); *G06F 21/572* (2013.01); *G06F 21/62* (2013.01); *G06F 2221/034* (2013.01)

(58) Field of Classification Search
CPC ...... G06F 21/575; G06F 9/445; G06F 9/5016; G06F 21/572; G06F 21/62; G06F 222/034
See application file for complete search history.

(56) References Cited

U.S. PATENT DOCUMENTS

| 9,112,867 | B2 | 8/2015 | Sastry et al. |
| 9,667,629 | B2 | 5/2017 | Tofighbakhsh |
| 9,678,896 | B2 | 6/2017 | O'Loughlin et al. |
| 2005/0050107 | A1* | 3/2005 | Mane ............ G06F 16/10 |

(Continued)

FOREIGN PATENT DOCUMENTS

| EP | 2791817 A1 | 10/2014 |
| EP | 3367287 A1 | 8/2018 |

OTHER PUBLICATIONS

International Search Report and Written Opinion—PCT/US2021/033930—ISA/EPO—dated Aug. 24, 2021.

*Primary Examiner* — Jaweed A Abbaszadeh
*Assistant Examiner* — Hyun Soo Kim
(74) *Attorney, Agent, or Firm* — Smith Tempel Blaha LLC/Qualcomm

(57) ABSTRACT

Resource access control in a system-on-chip ("SoC") may employ an agent executing on a processor of the SoC and a trust management engine of the SoC. The agent, such as, for example, a high-level operating system or a hypervisor, may be configured to allocate a resource comprising a memory region to an access domain and to load a software image associated with the access domain into the memory region. The trust management engine may be configured to lock the resource against access by any entity other than the access domain, to authenticate the software image associated with the access domain, and to initiate booting of the access domain in response to a successful authentication of the software image associated with the access domain.

27 Claims, 11 Drawing Sheets

(56) References Cited

U.S. PATENT DOCUMENTS

| | | | |
|---|---|---|---|
| 2006/0090084 A1* | 4/2006 | Buer | G06F 21/53 |
| | | | 713/189 |
| 2008/0201507 A1* | 8/2008 | Krampl | G06F 13/4291 |
| | | | 710/104 |
| 2013/0151846 A1* | 6/2013 | Baumann | H04L 9/3263 |
| | | | 713/168 |
| 2013/0282951 A1 | 10/2013 | Kuo et al. | |
| 2014/0280668 A1* | 9/2014 | Brown | G06F 3/067 |
| | | | 709/213 |
| 2017/0371809 A1* | 12/2017 | Benedict | G06F 12/1408 |
| 2018/0121125 A1 | 5/2018 | Zeng et al. | |
| 2018/0341768 A1 | 11/2018 | Marshall et al. | |
| 2019/0114431 A1 | 4/2019 | Cheng et al. | |
| 2021/0232510 A1* | 7/2021 | Ndu | G06F 21/44 |

\* cited by examiner

ACCESS CONTROL SYSTEM AND METHOD FOR ISOLATING MUTUALLY DISTRUSTING SECURITY DOMAINS

DESCRIPTION OF THE RELATED ART

Portable computing devices ("PCDs") are becoming necessities for people on personal and professional levels. These devices may include cellular telephones, tablet computers, palmtop computers, portable digital assistants ("PDAs"), portable game consoles, and other portable electronic devices. PCDs commonly contain integrated circuits or systems-on-a-chip ("SoCs") that include numerous components designed to work together to deliver functionality to a user. For example, an SoC may contain any number of processing engines, such as modems, central processing units ("CPUs") with multiple cores, graphical processing units ("GPUs"), etc. An SoC may be coupled to other components within a PCD, such as system memory, wireless communication transceivers (also referred to as modems), cameras, microphones, speakers, etc. The SoCs and other components may be coupled by one or more buses or other interconnects to provide data communication among them. The term "resource" may be used to refer to a component or portion of a component, such as a region of memory, register, port, etc., to which a processor may obtain access via a bus transaction.

Maintaining security against unauthorized access of resources is an important consideration in SoC design. The complexity of an SoC raises conflicting security requirements. For example, on one hand, a high-level operating system ("HLOS") running on a processor in the SoC may need to be able to limit access to resources from entities running on other SoC processors. On the other hand, an SoC vendor may wish to limit access by the HLOS to such other SoC processors, as such access could potentially expose the SoC vendor's intellectual property. The main or system memory is generally the most substantial or significant resource, and commonly, the HLOS manages the entire system memory. A need may also exist for entities in different security domains to collaborate, and carving out the system memory map to dedicate portions of system memory to different security domains may be undesirable.

Security is commonly provided in an SoC-based device in one of two general ways. One way is to provide SoC hardware that controls security across all subsystems. A drawback of this approach is that it is not scalable. It is not flexible to add new security domains, and it may comprise subsystems security. Another way is to enable the HLOS to control security across all subsystems by providing a form of super-user entity. A drawback of this approach is that the security may be exposed to open source and may be compromised. Neither of these conventional solutions address the conflicting security concerns described above.

SUMMARY OF THE DISCLOSURE

Systems, methods and computer program products are disclosed for resource access control in an SoC.

An exemplary method for resource access control in an SoC may include allocating a resource comprising a memory region to an access domain. An agent, such as an HLOS, may control or perform such allocation. The method may also include loading a software image associated with the access domain into the memory region. The HLOS or other agent may control or perform such loading. The method may further include locking the resource against access by any entity other than the access domain. A trust management engine may control or perform such locking. The method may still further include authenticating the software image associated with the access domain. The trust management engine may control or perform such authentication. The method may yet further include initiating booting of the access domain in response to a successful authentication of the software image. The trust management engine may initiate the booting.

An exemplary system for resource access control in an SoC may include an agent executing on a processor and a trust management engine. The agent may be configured to allocate a resource comprising a memory region to an access domain and to load a software image associated with the access domain into the memory region. The trust management engine may be configured to lock the resource against access by any entity other than the access domain, to authenticate the software image associated with the access domain, and to initiate booting of the access domain in response to a successful authentication of the software image associated with the access domain.

Another exemplary system for resource access control in an SoC may include means for allocating a resource comprising a memory region to an access domain and for loading a software image associated with the access domain into the memory region. The exemplary system may further include means for locking the resource against access by any entity other than the access domain, for authenticating the software image associated with the access domain, and for initiating booting of the access domain in response to a successful authentication of the software image.

An exemplary computer program product for resource access control in an SoC may comprise a computer-readable medium having stored thereon instructions that when executed on one or more processors of the SoC control a method. The method may include allocating a resource comprising a memory region to an access domain. The method may also include loading a software image associated with the access domain into the memory region. The method may further include locking the resource against access by any entity other than the access domain. The method may still further include authenticating the software image associated with the access domain. The method may yet further include initiating booting of the access domain in response to a successful authentication of the software image.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
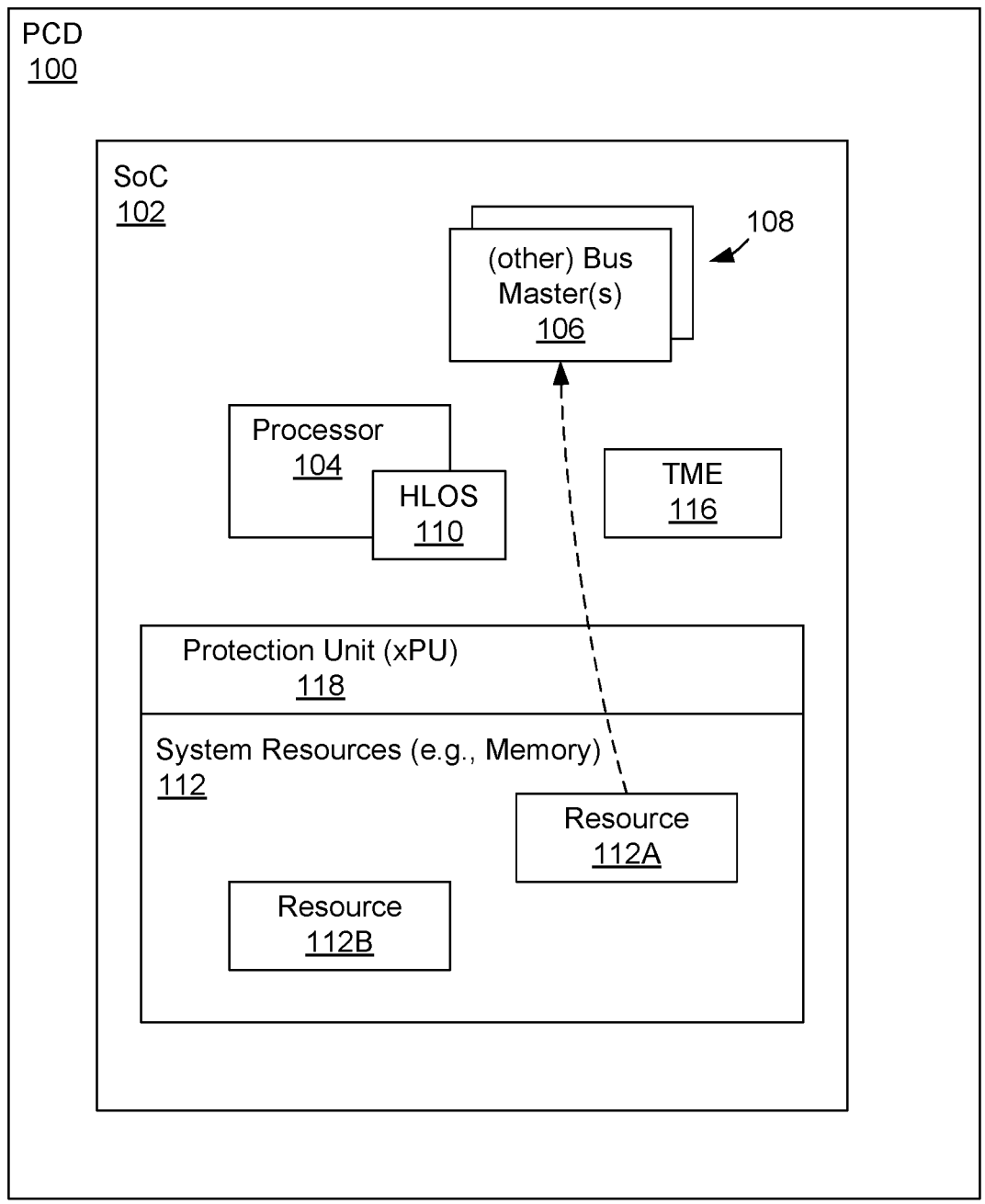
FIG. 1 is a block diagram of an SoC that includes a system for resource access control, in accordance with exemplary embodiments.

As illustrated in FIG. 1, in an illustrative or exemplary embodiment, a PCD 100 may include an SoC 102. The SoC 102 may include one or more processors 104 and one or more other bus masters 106. Although a bus or similar system interconnect is not shown in FIG. 1 for purposes of clarity, the term "bus master" is used in this disclosure to mean any component that is capable of initiating a bus transaction. A group of one or more bus masters may be referred to in this disclosure as an access domain or "AD." For example, the group of two bus masters 106 in FIG. 1 may form an AD 108.

The PCD 100 is intended only as an example of a device in which the SoC 102 may be included. More generally, examples of devices that may include an SoC in accordance with the present disclosure include: a computing system (e.g., server, datacenter, desktop computer), a mobile or portable computing device (e.g., laptop, cell phone, vehicle, etc.), an Internet of Things ("IoT") device, a virtual reality ("VR") system, an augmented reality ("AR") system, etc.

The processor 104 may also be referred to as a CPU, an application processor, etc., because in this exemplary embodiment the processor 104 may execute, among other software elements (not shown for purposes of clarity), a high-level operating system ("HLOS") 110. The term "HLOS" as used in this disclosure is intended to broadly encompass not only an HLOS but also a hypervisor, an HLOS in combination with a hypervisor, etc. An action performed or controlled by the processor 104 under the control of, or configured by, execution of the HLOS 110 may, for brevity of description, be referred to in this disclosure as an action performed by the HLOS 110. Similarly, an action performed or controlled by other processing hardware under the control of, or configured by, execution of any other software entity may, for brevity of description, be referred to in this disclosure as an action performed by such other software entity. Also, although for purposes of clarity the HLOS 110 is shown in FIG. 1 separately from other bus masters 106, it should be noted that the HLOS 110 is also a bus master (and thus is also a type of AD).

The SoC 102 may include system resources 112. The system resources 112 include the components and portions thereof of the PCD 100 to which a bus master, such as the HLOS 110, other bus masters 106, etc., may direct bus transactions. Stated another way, a "bus transaction," as the term is used in this disclosure, relates to a request for a system resource 112, such as a read request or a write request. Accordingly, the system resources 112 may be identified by addresses or address ranges within a system address space. Although for purposes of clarity in FIG. 1 the system resources 112 are depicted as being within the SoC 102, in other embodiments any or all such system resources may be external to an SoC. The system resources 112 may include, for example, dynamic random-access memory ("DRAM"), such as double data-rate DRAM ("DDR-DRAM"). Such DDR-DRAM (or, for brevity, "DDR") may provide the main system memory of the PCD 100, and a CPU or other processor 104 may execute applications (i.e., software) in such DDR. The system resources 112 may include other types of memory, such as, for example, flash memory, static RAM ("SRAM"), etc. The system resources 112 may include various registers, ports, and other addressable components. Note that as the system resources 112 are the subjects of transaction requests from bus masters, the system resources 112 may also be referred to as the subjects of transaction requests from ADs, as an AD is an entity comprising one or more bus masters.

For example, a first system resource 112A may comprise a first region of memory, a second system resource 112B may comprise a second region of memory, etc. Although only two system resources 112A and 112B are shown for purposes of example, any number of system resources 112 may be allocated in the system address space. Except as otherwise described in this disclosure, system resources 112 may be requested, allocated, and de-allocated in accordance with conventional computing principles well understood by one of ordinary skill in the art. For example, in response to certain operating conditions, a bus master 106 may initiate a request for a system resource 112. The present disclosure relates to systems and methods for controlling access to such a system resource 112, as conceptually indicated by the broken-line arrow in FIG. 1.

A trust management engine ("TME") 116 is a component that is involved in the access control system and method. To promote security, the TME 116 may be primarily embodied in hardware separate from the processor 104 on which the HLOS 110 executes, such as another processor, read-only memory ("ROM"), etc. (not separately shown in FIG. 1). The TME 116 may employ an authentication agent (not separately shown) that uses cryptographic methods to authenticate a software image. Such an authentication agent may be of a conventional type and is therefore not described in this disclosure. Although for purposes of clarity the TME 116 is shown in FIG. 1 separately from other bus masters 106 and the HLOS 110, it should be noted that the TME 116 is also a bus master (and thus also a type of AD).

A protection unit 118 may be configured to selectively protect system resources 112. There may be various types of protection units, each associated with a component capable of serving as or providing a resource. The term "xPU" may be used in this disclosure to refer broadly to any of a number of types ("x") of protection units associated with corresponding types of components. For example, an xPU associated with a memory may be referred to as a memory protection unit.

Figure 2:
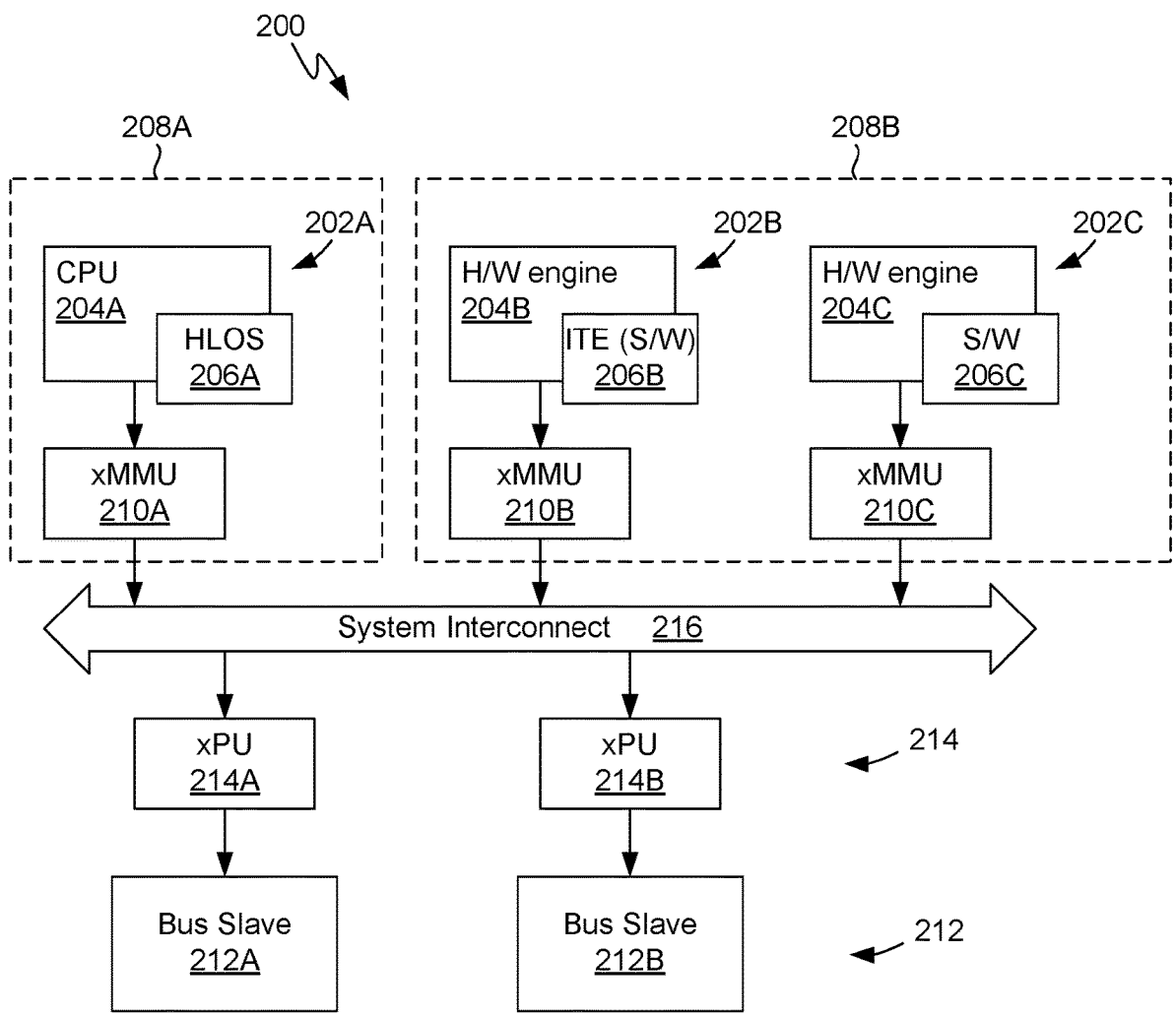
FIG. 2 is a block diagram showing bus masters and bus slaves in a system for resource access control, in accordance with exemplary embodiments.

As illustrated in FIG. 2, a system 200 may include two or more bus masters 202A, 202B, 202C, etc. While a portion of each of bus masters 202A, 202B, 202C, etc., may comprise hardware, one or more of bus masters 202A, 202B, 202C, etc., may also include a software portion. For example, a first bus master 202A may comprise a CPU 204A, which may execute a HLOS 206A. The CPU 204A may be an example of the above-described processor 104 (FIG. 1). A second bus master 202B may, for example, comprise a hardware engine 204B and a software portion that may be referred to in this disclosure as an intelligent and trusted entity ("ITE") 206B. Similarly, a third bus master 202C may comprise a hardware engine 204C and a software portion 206C. The second and third bus masters 202B and 202C may together form an access domain or AD 208B, such as the AD 108 described above with regard to FIG. 1. In an AD having two or more bus masters, the software portion of at least one of the bus masters is an ITE; software portions of other bus masters need not be ITEs. For example, the AD 208B may be a modem, where the bus masters 202B and 202C are scalar and vector modem cores, respectively. Although in this exemplary embodiment a modem comprises two bus masters 202B and 202C, in other embodiments a modem may, like other ADs, consist of only one bus master. Note that the first bus master 202A also forms an AD 208A. As the AD 208A is characterized by the HLOS 206A in execution, such an AD may be referred to for convenience in this disclosure as the HLOS, similarly to the HLOS 110 in FIG. 1.

The bus masters 202A, 202B, 202C, etc., may be configured to access resources via corresponding memory management units ("xMMUs") 210A, 210B, 210C, etc. The term "xMMU" may be used in this disclosure to refer broadly to an MMU of any of a number of types ("x") of MMUs associated with corresponding types of components, such as, for example, system memory (in contrast with another level or type of memory). Although for purposes of clarity in FIG. 2 each of bus masters 202A, 202B, and 202C is shown coupled to exactly one corresponding xMMU 210A, 210B, and 210C, in other examples (not shown) there may be additional elements through which a bus master may access resources, such as two or more stages of xMMUs.

Each of a number of bus slaves 212, such as bus slaves 212A and 212B, may serve as or provide corresponding system resources 112 (FIG. 1), such as memory, registers, ports, etc. Although two bus slaves 212A and 212B are shown, the system 200 may include any number of bus slaves 212. Each of the bus slaves 212A, 212B, etc., may be coupled to a system interconnect (e.g., a bus system) 216. The above-described xMMUs 210A, 210B, 210C, etc., are also coupled to the system interconnect 216. Each AD 208A, 208B, etc., may thus access a resource by participating in a bus transaction via the system interconnect 216.

Each of the bus slaves 212 that may provide system resources 112 (FIG. 1) is protected by a corresponding xPU 214, such as xPUs 214A and 214B. An xPU 214 may be an example of the protection unit 118 described above with regard to FIG. 1. An xPU 214 may be configured to protect or prevent access to system resources 112 provided by the bus slaves 212 in a manner described below.

Figure 3:
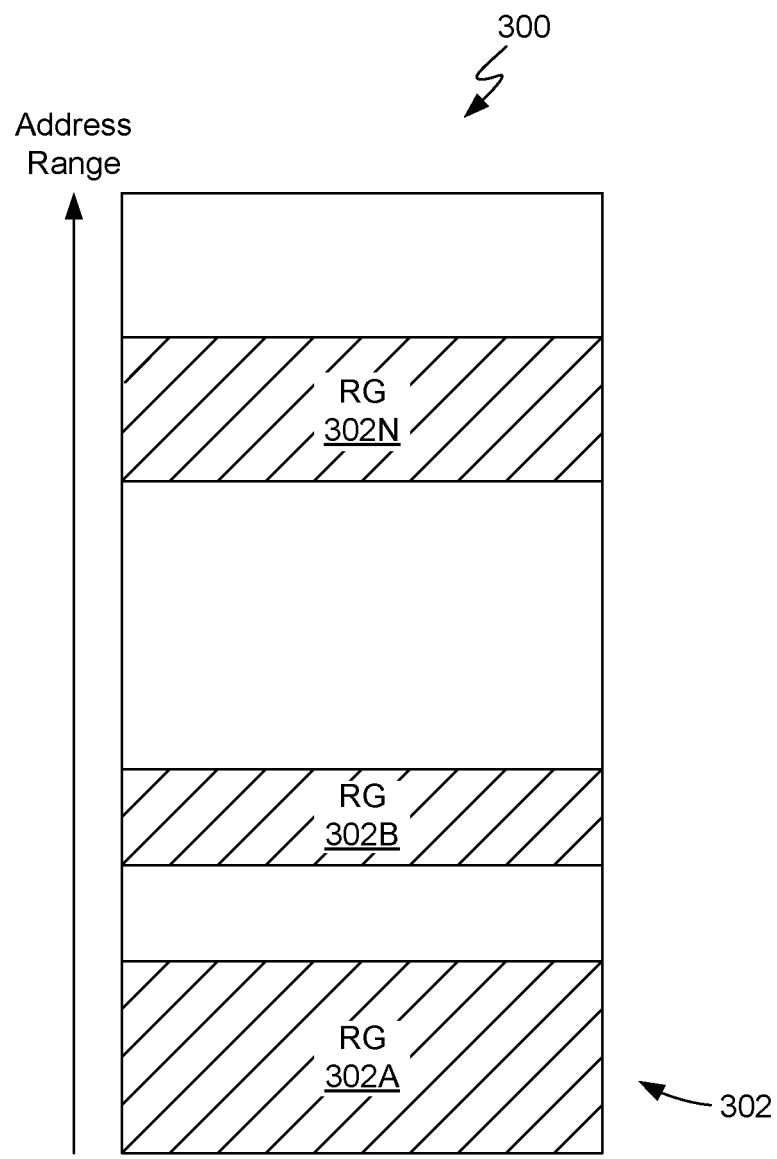
FIG. 3 is a system memory map showing an example of resource groups, in accordance with exemplary embodiments.

As illustrated in FIG. 3, a system memory map 300 represents regions in a system memory, which may be referred to in this disclosure as resource groups ("RG"s) 302. A region in a system memory (e.g., DDR), is an example of a system resource 112 (FIG. 1). Note that the terms "resource," "system resource," and "resource group" (or "RG") may be used essentially synonymously in this disclosure, with the term "resource group" (or "RG") being used in some instances to more specifically refer to a resource that has been allocated to an AD. As described below in further detail, an RG may be allocated to an AD by setting access permissions that allow the AD to access (i.e., complete a read or write transaction with) the RG. The term "owned by" (an AD) also may be used in this disclosure to refer to an RG that has been allocated to an AD. A resource that is owned by or allocated to an AD may also be referred to as belonging to, being part of, etc., the AD. As the term is used in this disclosure, "to allocate" an RG to an AD means not only to allocate the RG in a conventional sense (e.g., by defining or setting aside memory space) but also to make the AD an owner of the RG. An RG may only be accessed by an AD that owns that RG. An attempt to access an RG by any entity other than an owner of that RG is prevented or blocked by the associated xPU. In the exemplary embodiments described herein, a default or initial state (e.g., upon booting the PCD 100) may be that the HLOS 110 (FIG. 1) owns all system resources 112; other ADs, including the TME 116, cannot access any resources until such time as resources may be allocated to such other ADs.

In FIG. 3 the system memory map 300 illustrates an example in which various RGs 302A, 302B, etc., through 302N (collectively referred to as RGs 302) have been allocated to ADs. The remainder of the system memory map 300 represents system resources that have not been explicitly allocated to ADs and therefore, in accordance with the exemplary embodiment described herein, remain owned by the HLOS. RGs 302 may be located anywhere in the memory address range, and the locations depicted in FIG. 3 are intended only as examples.

Figure 11:
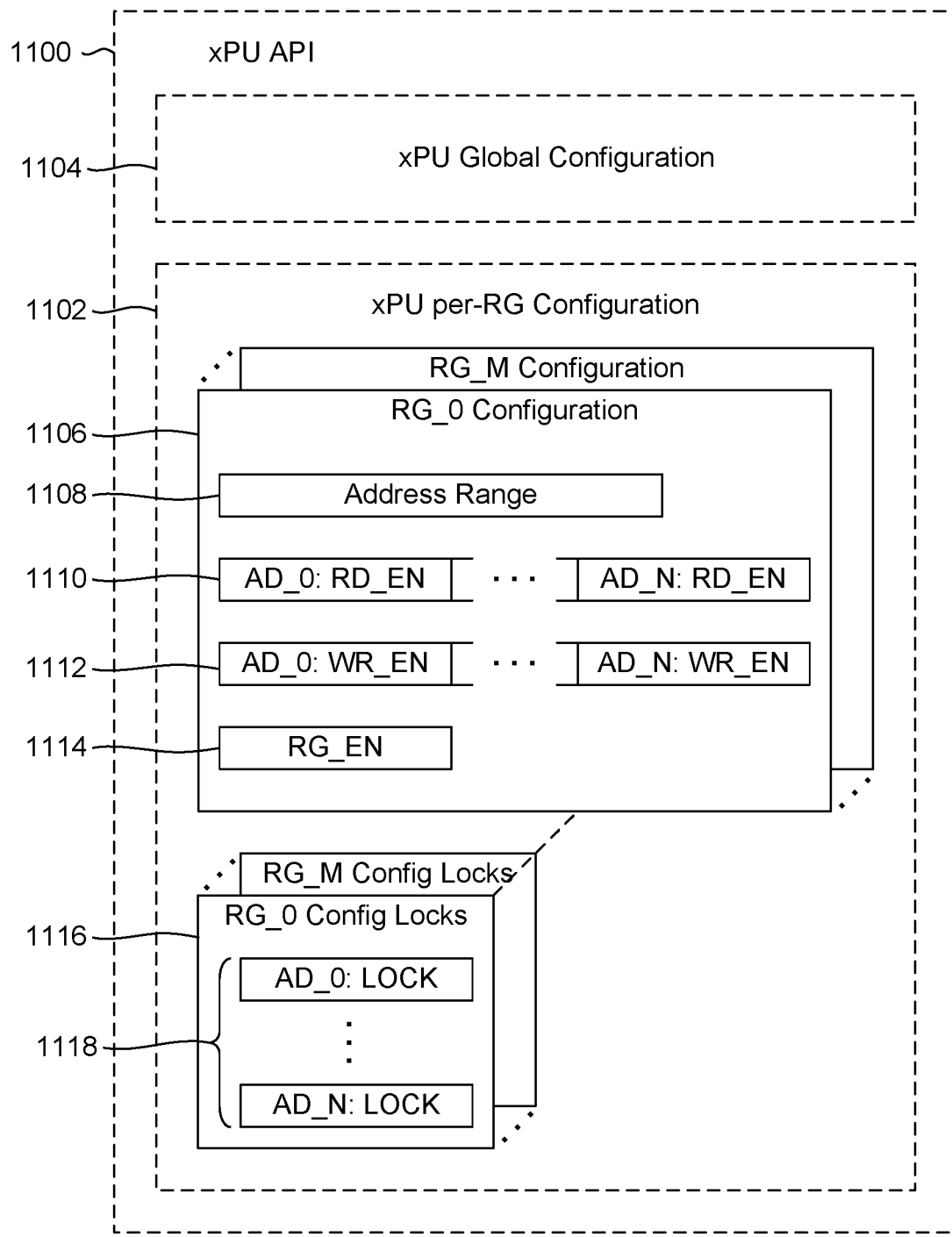
FIG. 11 is a block diagram of an application program interface for a protection unit, in accordance with exemplary embodiments.

As illustrated in FIG. 11, an xPU application program interface ("API") 1100, shown in conceptual form, represents an example of various configuration settings that an AD may provide to the xPU to configure or control how the xPU operates. The xPU API 1100 may have two portions: a per-RG configuration portion 1102 through which an AP may provide the xPU with configuration settings for (i.e., specific to) each RG, and a global configuration portion 1104 through which aspects of xPU operation not specific to any RG may be configured.

The per-RG configuration portion 1102 provides or programs the xPU with an RG configuration 1106 that configures the xPU for one of a number of RGs (e.g., "RG_0" through "RG_M," where M is a fixed number defining a maximum supported number (M+1) of RGs). Each RG configuration 1106 may include an address range 1108, access permissions comprising read permissions 1110 and write permissions 1112, and an RG enable setting 1114. In this exemplary embodiment, the xPU allows only the HLOS to set an RG configuration 1106, and such allowance is subject to the lock feature described below. The xPU in this embodiment blocks any attempt from any entity other than the HLOS to set an RG configuration 1106. For example, the xPU blocks any attempt by another AD, the TME, etc., to set an address range 1108, a read permission 1110, a write permission 1112, or the RG enable setting 1114. In other embodiments (not described herein), a feature may be provided to allow other ADs to set RG configurations. For example, although in the exemplary embodiment described herein the HLOS by default owns all unallocated system resources protected by the xPU, in other embodiments a mode setting may be provided in the global configuration portion 1104 through which the HLOS may select whether such ownership occurs by default or must occur by explicit allocation of RGs to the HLOS.

Using an address range 1108 provided by the HLOS, the xPU may identify or define an RG that the xPU is to protect. For example, the HLOS may define one of the RGs 302 described above with regard to FIG. 3 by providing a beginning address and ending address that the RG 302 spans.

The RG enable setting 1114 may be a single bit that the HLOS may provide to enable the xPU to begin protecting the RG defined by the address range 1106. For example, an RG enable setting 1114 having a value of "1" may enable the xPU to apply the permissions 1110 and 1112 as described below, while an RG enable setting 1114 having a value of "0" may indicate to the xPU that the RG has been disabled, i.e., the permissions 1110 and 1112 are not (or are no longer) applicable. Also, the HLOS may, in effect, return an RG to a pool of available resources by setting the RG enable setting 1114 to indicate that the permissions 1110 and 1112 are no longer applicable. In the exemplary embodiment described herein, an RG must be returned to the pool of available resources before the HLOS may allocate that RG to another AD.

The read permissions 1110 and write permissions 1112 may be provided in the form of one read-enable ("RD_EN") bit per AD and one write-enable ("WR_EN") bit per AD, respectively. For example, the read permissions 1110 for an RG may include bits "AD_0:RD_EN" through "AD_N: RD_EN" for the corresponding ADs (where N is a fixed number defining a maximum supported number (N+1) of ADs). Likewise, the write permissions 1112 may include bits "AD_0:WR_EN" through "AD_N:WR_EN" for the corresponding ADs. For example, a read-enable bit having a value of "1" may configure the xPU to enable (or not prevent) completion of a read transaction initiated by the corresponding AD directed to the RG, and a read-enable bit having a value of "0" may configure the xPU to prevent completion of a read transaction initiated by the corresponding AD directed to the RG. Likewise, a write-enable bit having a value of "1" may configure the xPU to enable completion of a write transaction initiated by the corresponding AD directed to the RG, and a write-enable bit having a value of "0" may configure the xPU to prevent completion of a write transaction initiated by the corresponding AD directed to the RG.

An AD owns or has been allocated an RG if at least one bit in the read permissions 1110 or at least one bit in the write permissions 1112 indicates that the AD is permitted to access the RG. Note that through the read permissions 1110 and write permissions 1112 an AD may be provided with both read and write permission, read-only permission, etc., thereby controlling the type of access the AD may have to a particular RG.

Each transaction request that an AD generates may include an AD identifier, i.e., a value uniquely identifying that AD. The bits of the read and write permissions 1110 and 1112 may be indexed by the AD identifiers. When the xPU receives a transaction request, the xPU may compare the AD identifier included in a transaction request with the corresponding bit value in the read permission 1110 or write permission 1112, and then based on the comparison either enable or prevent completion of the requested transaction.

The per-RG configuration portion 1102 further provides the xPU with RG configuration lock bit groups 1116. Each RG configuration lock bit group 1116 corresponds to one of the above-described RG configurations 1106. Each RG configuration lock bit group 1116 may consist of a number of lock bits 1118 equal to the number of ADs. That is, each AD corresponds to one lock bit 1118. For example, a first lock bit 1118 ("AD_0: LOCK") corresponds to a first AD, a second lock bit 1118 ("AD_1: LOCK") corresponds to a second AD, etc., though an Nth lock bit ("AD_N: LOCK") that corresponds to an Nth AD. As the HLOS and TME are types of ADs, one of the lock bits 1118, such as, for example, the first lock bit 1118, may correspond to the HLOS, and another of the lock bits 1118, such as, for example, the second lock bit 1118, may correspond to the TME.

The xPU allows a lock bit 1118 to be set only by the corresponding AD. That is, the xPU blocks or ignores any attempt to set a lock bit 1118 by any entity other than the AD corresponding to that lock bit 1118. Each lock bit 1118 can have a value indicating a state of "locked" or a state of "unlocked." The terms "locked" and "unlocked" refer to the RG configuration 1106; setting one or more lock bits 1118 in an RG configuration lock bit group 1116 to a value indicating a "locked" state configures the xPU to prevent any entity from modifying the corresponding RG configuration 1106. That is, an RG configuration 1106 is locked or cannot be modified when any one or more lock bits 1118 in the group 1116 corresponding to that RG configuration 1106 are set. By setting its corresponding lock bit 1118, an AD can establish trust in an RG configuration 1106 by preventing any other AD, including the HLOS, TME, etc. from thereafter modifying the RG configuration 1106.

The xPU allows a lock bit 1118 in a group 1116 to be set by the corresponding AD only if that AD owns the RG corresponding to that group 1116. If an AD attempts to lock an RG configuration 1106 in which the AD has no permissions to access the RG, the xPU blocks the attempt from succeeding.

The SoC 102 (FIG. 1) may perform a cold boot or hardware-based reset to become ready for normal or "mission-mode" operation, which may include providing resource access control in the manner described below. Such a cold boot may involve entities that are not directly relevant to the present disclosure, such as one or more bootloaders. Accordingly, such details are not described herein. Nevertheless, it may be useful to understand that the one or more bootloaders (which may be stored in ROM) are executed on the CPU 104 to load the HLOS 110 into a system memory (i.e., in system resources 112) and boot the HLOS 110. A bootloader may load the HLOS 110 into system memory by, for example, copying the HLOS 110 (software image) from flash or other non-volatile memory. As a result, the HLOS 110 begins to execute. In some examples, a bootloader may load a secure execution environment ("SEE") or other intermediary software, which in turn loads and boots the HLOS 110. As understood by one of ordinary skill in the art, a SEE (sometimes referred to as a trusted execution environment or "TEE") comprises software that, generally in conjunction with secure processor hardware, isolates trusted applications running in the SEE from untrusted applications running on the main (untrusted) HLOS. Nevertheless, in the context of the present disclosure a SEE is mentioned only as an example of intermediary software that may be loaded before the HLOS is loaded, and embodiments need not include a SEE or other intermediary software. Then, as described below, the HLOS 110 in turn may load and boot one or more other ADs 108. The TME 116 may boot contemporaneously with the HLOS 110. It should be noted that the TME 116 (and any SEE) may take ownership of resources in essentially the same manner described below with regard to any other AD 108. In this manner, the HLOS 110 may establish trust in the TME 116 (and any SEE).

Figure 4:
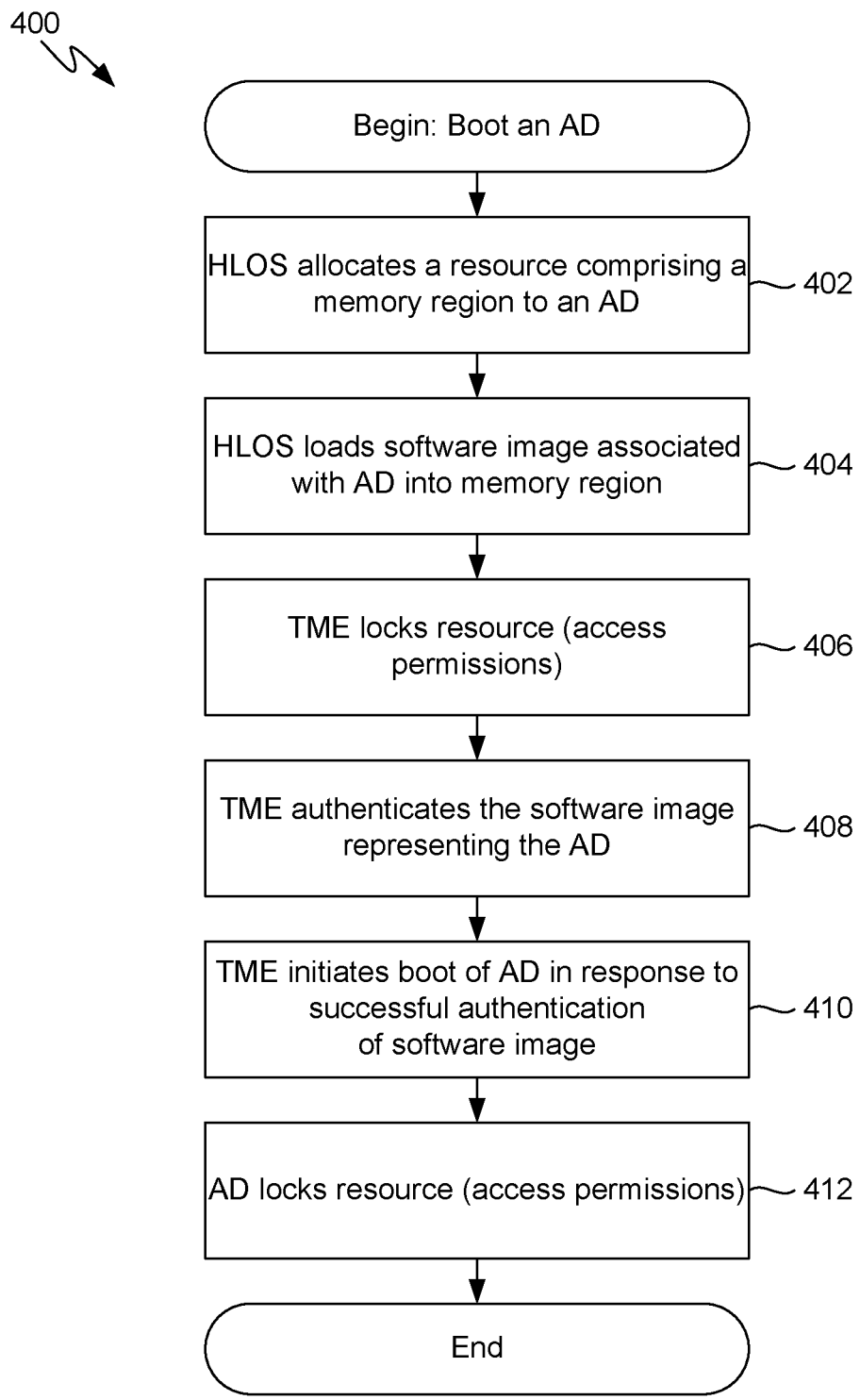
FIG. 4 is a flow diagram illustrating a method for resource access control relating to booting an access domain, in accordance with exemplary embodiments.

As illustrated in FIG. 4, a method 400 for resource access control in an SoC may comprise booting an AD, such as, for example, any of the above-described ADs 108 (FIG. 1) or 208B (FIG. 2). As indicated by block 402, the HLOS 110 or other agent may allocate a resource to the AD. As described above, the resource may be, for example, a memory region in which the AD is to execute. In an exemplary embodiment, allocating a resource in accordance with block 402 may include configuring access permissions in an xPU protecting the resource to enable the AD to access the resource. For example, the access permissions may be configured to give an AD read permission, write permission, or both read and write permission. Allocating the resource may also include configuring the access permissions so that the TME 116 (FIG. 1) has sufficient access permission (e.g., read-only) to perform the authentication described below. With this exception for the TME 116, the access permissions are configured to prevent access to the resource by any AD other than the AD that is being booted.

Although in the exemplary embodiments described herein the agent that performs or controls the allocation of resources is the HLOS 110, in other embodiments an agent other than an HLOS may perform or control the allocation of resources or a portion of such allocation. For example, in other embodiments an HLOS may perform some aspects of the resource allocation described herein, such as allocating address ranges, while another agent configures the access permissions.

As indicated by block 404, the HLOS 110 or other agent may load a software image associated with the AD into the memory region (resource). The software image may be an ITE and may be obtained from ROM or another source.

As indicated by block 406, the TME 116 (FIG. 1) may then lock the resource against access by any entity other than the AD that is being booted, with the exception that the TME 116 may have sufficient access permission to perform the authentication described below. In an exemplary embodiment, locking the resource against access in accordance with block 406 may comprise locking a resource configuration by setting a lock bit in the xPU protecting the resource. As the access permissions may have been configured by the HLOS 110 or other agent as described above (block 402), locking the resource configuration thereby locks the resource itself against access in accordance with those access permissions. Note that locking the resource configuration in this manner locks the access permissions against modification by the HLOS 110 (FIG. 1).

As indicated by block 408, the TME 116 may authenticate the software image associated with the AD that has been loaded into memory and locked. As indicated by block 410, upon successful authentication of that software image, the TME 116 may initiate (or if booting has already begun, take no action to prevent continuation of) booting of the AD. As indicated by block 412, the booting AD may then lock the resource against access by any entity other than itself. Thus the resource may be locked against access by the TME 116 and the HLOS 110. In an exemplary method described below with regard to FIG. 5, the AD locking the resource may be conditioned upon successful validation of the resource by the AD and upon removal of the TME's permission to access the resource.

In examples in which an AD includes two or more bus masters, each having a software portion, the operations described above with regard to blocks 402-412 may be performed upon the software image that is the ITE, such as the above-described ITE 206B (FIG. 2). In such examples, booting the AD may result in the ITE 206B beginning to operate or execute on its associated hardware engine (where the ITE 206B and associated hardware engine 204B together function as the first bus master 202B), and the ITE in turn initiating booting of a second bus master 202C by performing the operations described above with regard to blocks 402-412 on a second software image. In an example in which the AD includes three bus masters (not shown), a second bus master may boot a third bus master, etc. Note that the second and third bus masters in such an example may boot independently of the TME; the TME need only boot the first bus master.

Figure 5:
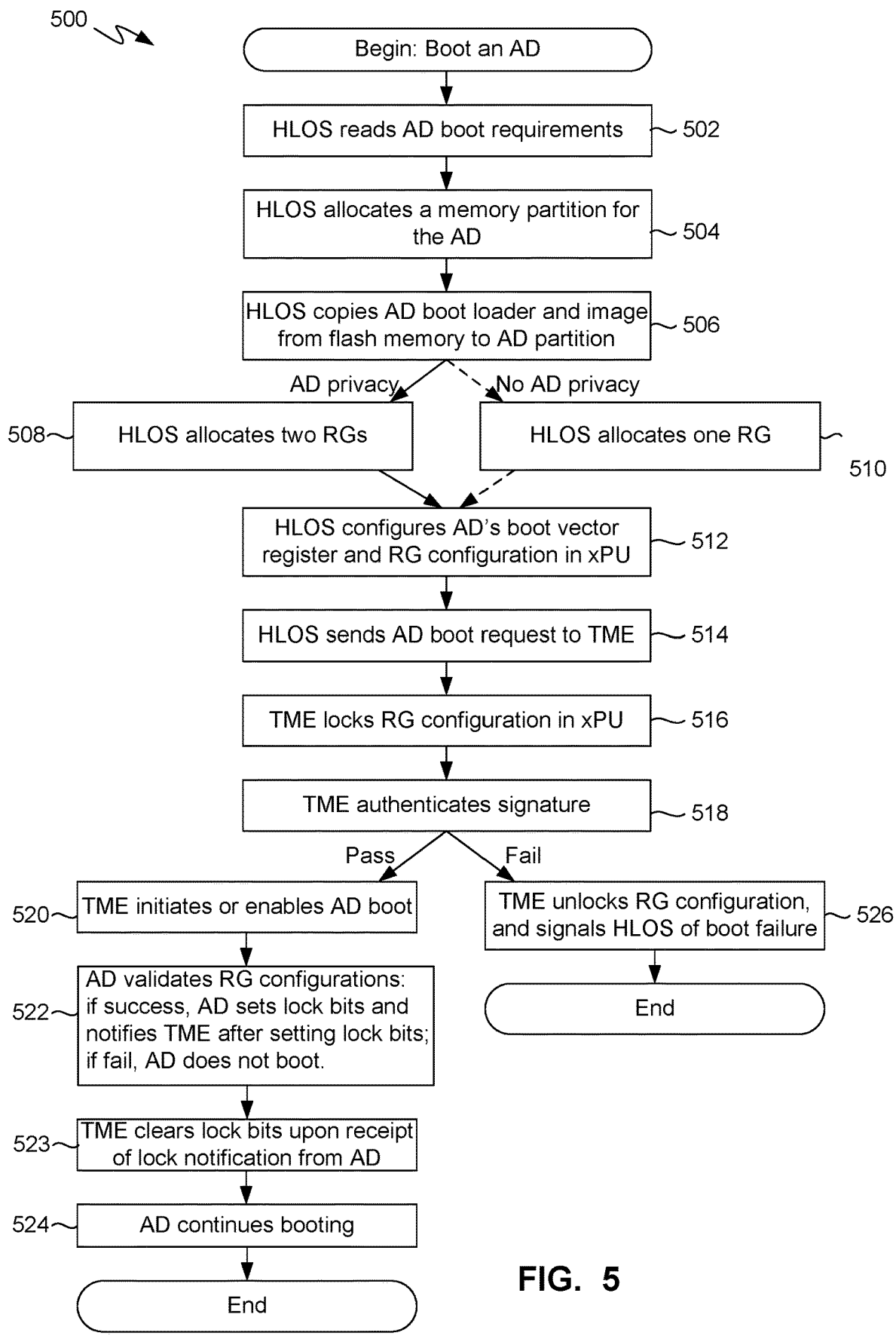
FIG. 5 is another flow diagram illustrating a method for booting an access domain, in accordance with exemplary embodiments.

As illustrated in FIG. 5, a method 500 for resource access control in an SoC may comprise booting an AD. The method 500 may be an example of the above-described method 400 (FIG. 4).

As indicated by block 502, the HLOS may read AD boot requirements, such as, for example, memory requirements for an AD (e.g., number of partitions and size of each partition), clock/power requirements for an AD, etc. As indicated by block 504, the HLOS may allocate one memory partition for the AD. The memory partition is HLOS-owned at this time, and is physically contiguous. As indicated by block 506, the HLOS may load (i.e., copy) the AD software image from a non-volatile memory into the AD memory partition. The HLOS may also load any bootloader associated with the AD into the memory partition.

An AD may or may not be of a type having a privacy characteristic. "Privacy" in this context refers to third-party content that only the AD should be able to read. This content may be stored in encrypted form in flash memory, and the HLOS may load the encrypted content into its dedicated partition in system memory. This region may be decrypted by the AD's primary bootloader after the AD has booted up. If the AD has privacy, then as indicated by block 508 the HLOS may create two RGs: one RG for the AD's primary boot loader, and another RG for the rest of the AD memory allocation. If the AD does not have privacy, then as indicated by block 510 the HLOS may create one RG for the AD's entire memory allocation.

As indicated by block 512, the HLOS may then configure the AD's boot vector register. The HLOS may also configure the xPU(s) protecting the AD's register space. For example, the HLOS may use the xPU API 1100 (FIG. 11) to configure the xPU(s) with an RG configuration 1106. The RG configuration may include access permissions for the AD to have read and write access to the RG. The RG configuration may also include access permissions for the TME to have read access to the RG so that the TME can perform the authentication described below. As indicated by block 514, the HLOS may then send a request to the TME to boot the AD. As described above, booting the AD encompasses booting all bus masters in the AD.

As indicated by block 516, the TME locks the AD's one or more RG configurations by setting its lock bit in the corresponding xPUs. In the context of the locking feature, to "set" a lock bit means setting the RG configuration to a "locked" state, and to "clear" a lock bit means setting the RG configuration to an "unlocked" state. The TME may read the memory allocation information and confirm that the xPU configurations are correct. Note that setting the TME's lock bit prevents any entity, including the HLOS, the TME, etc., from modifying the RG configuration.

As indicated by block 518, the TME may then authenticate the software image, such as, for example, by authenticating the software image's signature. The authentication may be performed in a conventional manner using cryptographic techniques (e.g., keys), as understood by one of ordinary skill in the art. If the TME determines that the authentication succeeded, the TME may initiate booting of the AD, as indicated by block 520. This may include the TME enabling boot resources and releasing the AD from reset, so that the AD is enabled or allowed to boot. As described above, ADs commonly include subsystems with dedicated processors and clock/power domains. "Releasing an AD from reset" means doing all the necessary hardware configuration to bring the AD subsystem and processor out of a reset state. While hardware portions of the AD become active in the foregoing manner, the AD software image or software portion of the AD begins to boot or execute in the memory region or partition into which it was loaded.

As indicated by block 522, once the AD starts executing, it may validate its one or more RGs by inspecting the RG configuration in the xPU. An AD is always permitted to inspect (i.e., read) RG configurations, such as the above-described RG configuration 1106 (FIG. 11), including RG access permissions. If the validation of an RG configuration is successful, the AD may set its corresponding lock bit. The validation is successful if the AD confirms that its RG access permissions conform to the AD's expectations. For example, an AD may generally expect the RG access permissions to indicate that the RG is owned by that AD only, i.e., no entity other than that AD is permitted to access that RG. If the RG access permissions allow an unexpected entity access to the RG, then the AD rejects the RG configuration as invalid (i.e., the validation fails) and halts the boot. As the AD in this example has just begun to boot (i.e., execute), the AD may expect the TME to still have read access (but not write access) to the RG.

On successful RG configuration validation, and after the AD has set its corresponding lock bit, the AD may notify the TME. As indicated by block 523, the TME may clear its lock bit when it receives this notification from the AD. Clearing of the TME's lock bit for an RG may trigger the xPU to automatically (i.e., without intervention by the HLOS or other entity) also remove the TME's access permissions for that RG, as the TME's clearing of its lock bit indicates the TME no longer requires access to the RG. As the AD's lock bit remains set, the RG configuration is locked against access by the TME, the HLOS, and any other AD that does not own the RG. As indicated by block 524, the AD may then continue booting.

If the TME determines (block 518) that the authentication failed, the TME may unlock the one or more RG configurations associated with the RG containing the AD's software image, and signal the HLOS that the boot operation failed, as indicated by block 526. The TME may also control a hardware reset signal (not shown) applied to the AD's hardware engine, and may only release the hardware reset signal if the authentication succeeds.

Figure 6:
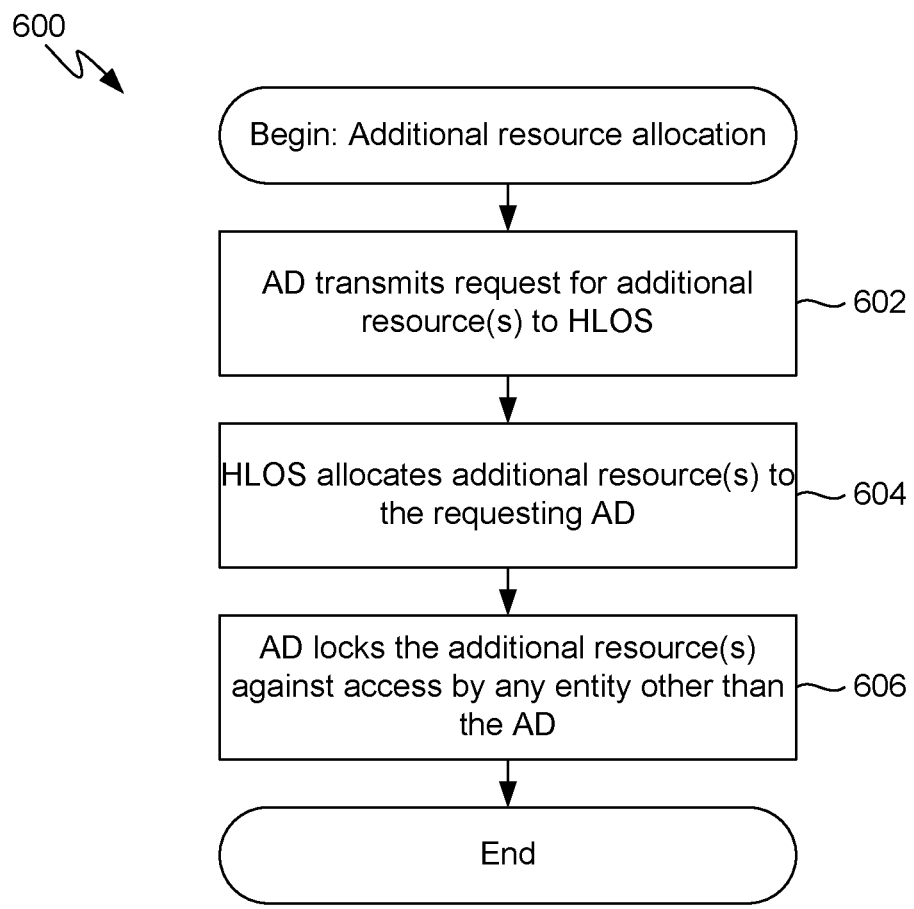
FIG. 6 is a flow diagram illustrating a method for resource access control relating to allocating an additional resource, in accordance with exemplary embodiments.

As illustrated in FIG. 6, a method 600 for resource access control in an SoC may comprise allocating an additional resource to an AD, such as, for example, any of the above-described ADs 108 (FIG. 1) or 208B (FIG. 2). As indicated by block 602, the AD may transmit a request for one or more additional resources to the HLOS. "Additional" in this context means in addition to the memory space in which the AD's software image resides and which was allocated to the AD when the AD was booted. As indicated by block 604, the HLOS may then allocate the additional resource or resources to the requesting AD. As indicated by block 606, the AD may then, by setting a lock bit of the corresponding xPU, lock the RG configuration associated with the additional resource against access by any entity other than the requesting AD. Note that locking the resource in this manner locks the resource against access by the HLOS, the TME, and any other entity other than the requesting AD.

Figure 7:
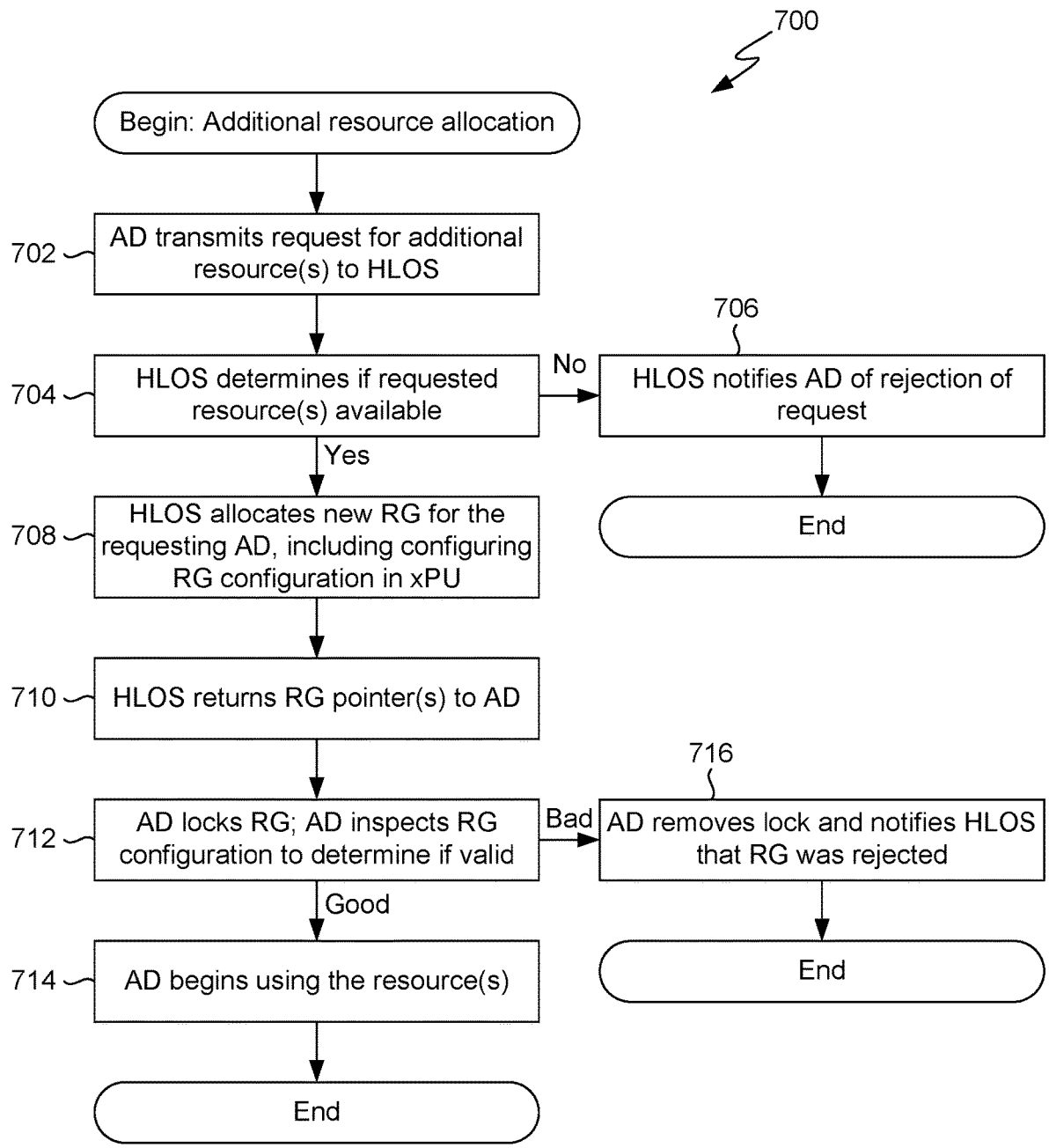
FIG. 7 is another flow diagram illustrating a method for allocating an additional resource, in accordance with exemplary embodiments.

As illustrated in FIG. 7, a method 700 for resource access control in an SoC may comprise allocating an additional resource to an AD. The method 700 may be an example of the above-described method 600 (FIG. 6).

As indicated by block 702, the AD may transmit a request for one or more additional resources to the HLOS. The request may include, for example, an amount of memory space being requested, as well as access permissions being requested. As indicated by block 704, the HLOS may determine if the requested resource is available. If the requested resource is not available, the HLOS may notify the AD that the request is rejected, as indicated by block 706. If the requested resource is available, the HLOS may allocate a new RG, as indicated by block 708. Allocating the new RG may include providing or programming the xPU protecting the resource with an RG configuration, which may include an RG address range, access permissions, etc. For example, the HLOS may use the xPU API 1100 (FIG. 11) to configure the xPU with an RG configuration 1106. Then, the HLOS may return a pointer to the newly created RG to the requesting AD, as indicated by block 710.

As indicated by block 712, the requesting AD may lock the RG and inspect the RG configuration to determine whether it is "valid" or "invalid." As described above with regard to block 522 (FIG. 5), an AD may consider an RG configuration to be valid if the RG access permissions are as per the AD's expectations. For example, if the AD expects no other entity to have access to the resource, then the RG access permissions should allow only that AD to have access to the resource. If the RG access permissions allow any other entity access to the resource, then AD rejects the RG configuration as invalid. If the RG configuration is "invalid," the AD may remove the lock and notify the HLOS that the RG is rejected, as indicated by block 716. If the RG configuration is "valid," the AD may begin using the RG, as indicated by block 714.

Figure 8:
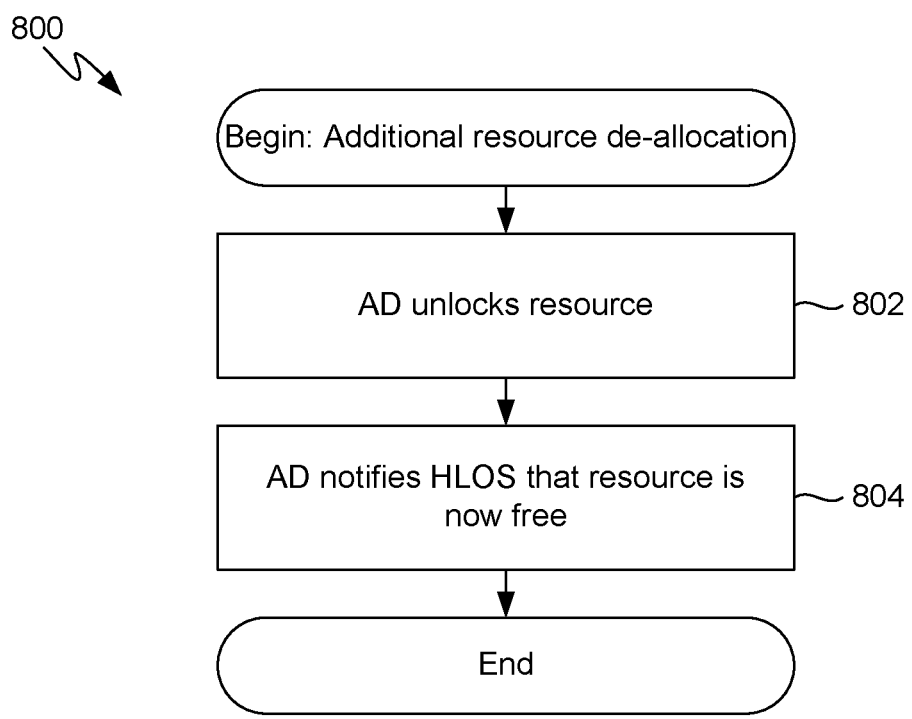
FIG. 8 is a flow diagram illustrating a method for resource access control relating to de-allocating an additional resource, in accordance with exemplary embodiments.

As illustrated in FIG. 8, a method 800 for resource access control in an SoC may comprise de-allocating an additional resource that had been allocated to an AD, such as by the above-described method 600 (FIG. 6) or 700 (FIG. 7). As indicated by block 802, an AD may unlock the resource. As indicated by block 804, the AD may then notify the HLOS that the resource is now free.

Figure 9:
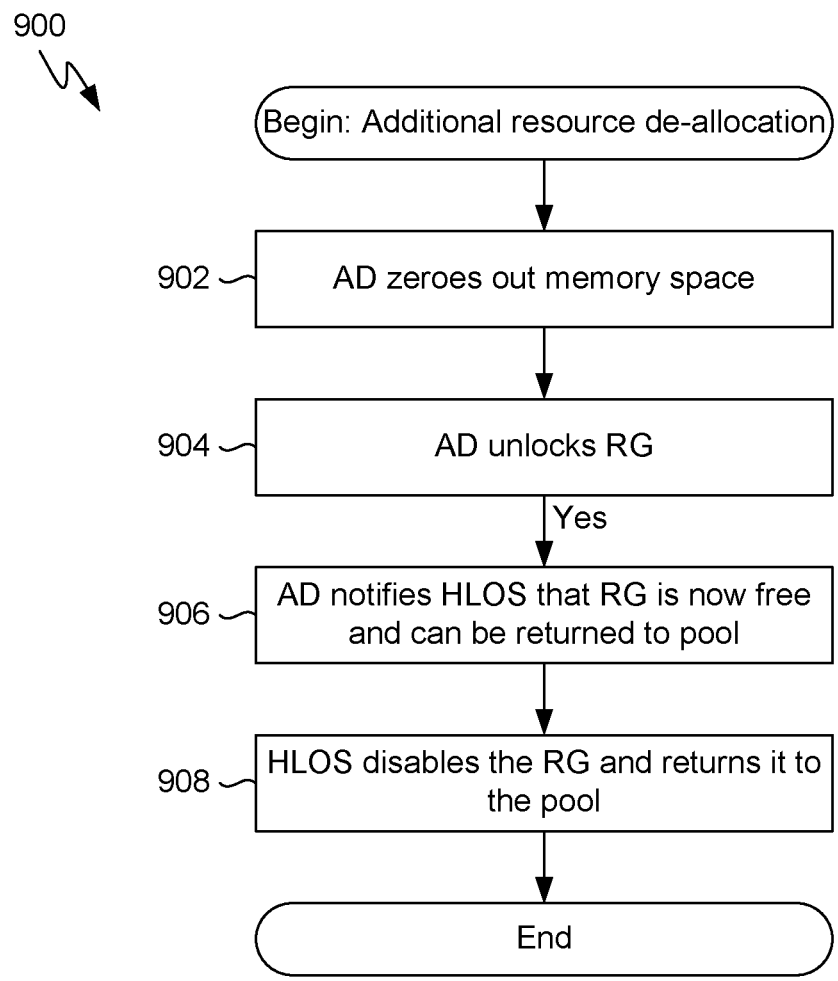
FIG. 9 is another flow diagram illustrating a method for de-allocating an additional resource, in accordance with exemplary embodiments.

As illustrated in FIG. 9, a method 900 for resource access control in an SoC may comprise de-allocating an additional resource that had been allocated to an AD. The method 900 may be an example of the above-described method 800 (FIG. 8).

As indicated by block 902, an AD may zero out memory space that had been allocated for an RG. Zeroing out memory space erases data that could otherwise be susceptible to unauthorized access and thus provides additional security or privacy that may be desirable in some embodiments. As indicated by block 904, the AD may unlock the RG. As indicated by block 906, the AD may then notify the HLOS that the RG is now free and can be returned to the pool or list of "unused" RGs. As indicated by block 908, the HLOS may disable the RG and return it to the pool. "Disabling an RG" means the xPU no longer uses this RG for access control. The HLOS may disable the RG using the RG enable setting 1114 of the xPU API 1100 (FIG. 11).

Figure 10:
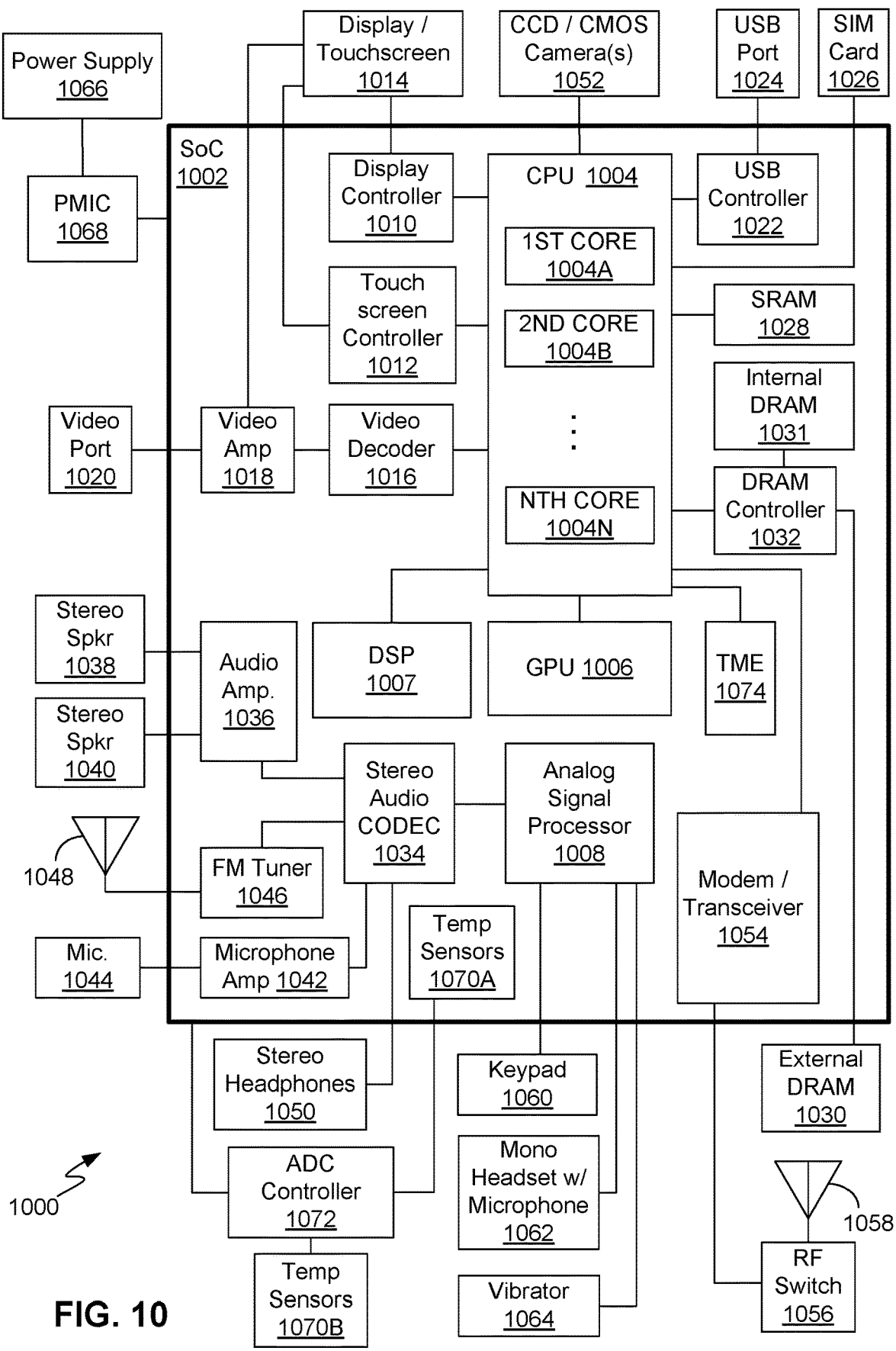
FIG. 10 is a block diagram of a PCD, in accordance with exemplary embodiments.

As illustrated in FIG. 10, exemplary embodiments of systems and methods for resource access control may be embodied in a PCD 1000. The PCD 1000 includes an SoC 1002. The SoC 1002 may include a CPU 1004, a GPU 1006, a DSP 1007, an analog signal processor 1008, or other processors. The CPU 1004 may include multiple cores, such as a first core 1004A, a second core 1004B, etc., through an Nth core 1004N. The CPU 1004 or any of its cores may be an example of the above-described processor 104 (FIG. 1) or CPU 204A (FIG. 2).

A display controller 1010 and a touchscreen controller 1012 may be coupled to the CPU 1004. A touchscreen display 1014 external to the SoC 1002 may be coupled to the display controller 1010 and the touchscreen controller 1012. The PCD 1000 may further include a video decoder 1016 coupled to the CPU 1004. A video amplifier 1018 may be coupled to the video decoder 1016 and the touchscreen display 1014. A video port 1020 may be coupled to the video amplifier 1018. A universal serial bus ("USB") controller 1022 may also be coupled to CPU 1004, and a USB port 1024 may be coupled to the USB controller 1022. A subscriber identity module ("SIM") card 1026 may also be coupled to the CPU 1004.

One or more memories may be coupled to the CPU 1004. The one or more memories may include both volatile and non-volatile memories. Examples of volatile memories include static random access memory ("SRAM") 1028 and dynamic RAMs ("DRAM"s) 1030 and 1031. The DRAMs 1030 and 1031 or portions thereof may be examples of the above-described system memory 112 (FIG. 1). Such memories may be external to the SoC 1002, such as the DRAM 1030, or internal to the SoC 1002, such as the DRAM 1031. A DRAM controller 1032 coupled to the CPU 1004 may control the writing of data to, and reading of data from, the DRAMs 1030 and 1031. In other embodiments, such a DRAM controller may be included within a processor, such as the CPU 1004. The CPU 1004 may execute an HLOS or other software that is stored in any of the aforementioned memories.

A stereo audio CODEC 1034 may be coupled to the analog signal processor 1008. Further, an audio amplifier 1036 may be coupled to the stereo audio CODEC 1034. First and second stereo speakers 1038 and 1040, respectively, may be coupled to the audio amplifier 1036. In addition, a microphone amplifier 1042 may be coupled to the stereo audio CODEC 1034, and a microphone 1044 may be coupled to the microphone amplifier 1042. A frequency modulation ("FM") radio tuner 1046 may be coupled to the stereo audio CODEC 1034. An FM antenna 1048 may be coupled to the FM radio tuner 1046. Further, stereo headphones 1050 may be coupled to the stereo audio CODEC 1034. Other devices that may be coupled to the CPU 1004 include one or more digital (e.g., CCD or CMOS) cameras 1052.

A modem or RF transceiver 1054 may be coupled to the analog signal processor 1008. The modem or RF transceiver 1054 or a portion thereof may be an example of the above-described AD 108 (FIG. 1) or 208B (FIG. 2). An RF switch 1056 may be coupled to the RF transceiver 1054 and an RF antenna 1058. In addition, a keypad 1060, a mono headset with a microphone 1062, and a vibrator device 1064 may be coupled to the analog signal processor 1008.

A power supply 1066 may be coupled to the SoC 1002 via a power management integrated circuit ("PMIC") 1068. The power supply 1066 may include a rechargeable battery or a DC power supply that is derived from an AC-to-DC transformer connected to an AC power source.

The SoC 1002 may have one or more internal or on-chip thermal sensors 1070A and may be coupled to one or more external or off-chip thermal sensors 1070B. An analog-to-digital converter ("ADC") controller 1072 may convert voltage drops produced by the thermal sensors 1070A and 1070B to digital signals.

The touch screen display 1014, the video port 1020, the USB port 1024, the camera 1052, the first stereo speaker 1038, the second stereo speaker 1040, the microphone 1044, the FM antenna 1048, the stereo headphones 1050, the RF switch 1056, the RF antenna 1058, the keypad 1060, the mono headset 1062, the vibrator 1064, the thermal sensors 1050B, the ADC controller 1052, the PMIC 1068, the power supply 1066, the DRAM 1030, and the SIM card 1026 are external to the SoC 1002 in this exemplary embodiment. It will be understood, however, that in other embodiments one or more of these devices may be included in such an SoC.

The SoC 1002 may include a TME 1074, which may be an example of the above-described TME 116 (FIG. 1). The TME 1074 may include processor hardware and accordingly may execute firmware or software to control portions of the methods described above.

Any of the components of the SoC 1002 that are configured as bus masters may be examples of the above-described bus masters 106 (FIG. 1), 202A, 202B or 202C (FIG. 2). The modem 1054 or a portion thereof is an example of a component that may serve as a bus master. The bus masters may include processor hardware and accordingly may execute firmware or software to control portions of the methods described above with regard to ADs. Similarly, any of the components of the SoC 1002 that are configured as bus slaves may be examples of the above-described bus slaves 212 (FIG. 2) that serve as or provide resources. Although not shown in FIG. 10 for purposes of clarity, the bus slaves may be coupled to xPUs. Although likewise not shown in FIG. 10, the bus master, bus slave, and other components of the SoC 1002 may communicate via an interconnect or bus system, as described above with regard to FIG. 2.

Firmware or software may be stored in any of the above-described memories, such as DRAM 1030 or 1031, SRAM 1028, etc., or may be stored in a local memory directly accessible by the processor hardware on which the software or firmware executes. Any such memory having firmware or software stored therein in computer-readable form for execution by processor hardware (e.g., CPU, TME, AD, etc.) may be an example of a "computer program product," "computer-readable medium," etc., as such terms are understood in the patent lexicon.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for resource access control in a system-on-chip ("Sort"), comprising:
   allocating to an access domain, by an agent executing on a processor, a resource within the system-on-chip comprising a memory region;
   loading, by the agent, a software image associated with the access domain into the memory region;
   locking, by a trust management engine, the resource against access by any entity other than the access domain and the trust management engine by setting a resource group configuration in a protection unit, the protection unit being coupled to and separate from the resource; the protection unit being coupled to a communication bus; the protection unit being separate from the processor; the protection unit comprising programmable logic for supporting the resource group configuration;

authenticating, by the trust management engine, the software image associated with the access domain;

initiating booting, by the trust management engine, of the access domain in response to a successful authentication of the software image associated with the access domain;

inspecting the resource group configuration in the protection unit by the access domain to determine if the resource group configuration is valid; and the access domain locking the resource against access by the trust management engine if the resource group configuration in the protection unit is determined valid by the access domain.

2. The method of claim 1, wherein the agent comprises a high-level operating system.

3. The method of claim 2, wherein the access domain comprises a modem.

4. The method of claim 1, wherein the access domain comprises one or more bus masters.

5. The method of claim 4, wherein booting comprises a first bus master of the access domain initiating booting of a second bus master of the access domain after the first bus master completes booting, the second bus master booting independently of the trust management engine.

6. The method of claim 1, further comprising:
the access domain transmitting a request to allocate an additional resource comprising an additional memory region to a high-level operating system ("HLOS");
allocating, by the HLOS, the additional resource to the access domain;
locking, by the access domain, the additional resource against access by any entity other than the access domain.

7. The method of claim 6, further comprising:
unlocking, by the access domain, the additional resource against access by another entity; and
the access domain transmitting to the HLOS an indication that the additional resource is free.

8. A system for resource access control in a system-on-chip ("Sort"), comprising:
an agent executing on a processor and configured to:
allocate a resource within the system-on-chip comprising a memory region to an access domain; and
load a software image associated with the access domain into the memory region; and
a trust management engine configured to:
lock the resource against access by any entity other than the access domain and the trust management engine by setting a resource group configuration in a protection unit, the protection unit being coupled to and separate from the resource; the protection unit being coupled to a communication bus; the protection unit being separate from the processor; the protection unit comprising programmable logic for supporting the resource group configuration;
authenticate the software image associated with the access domain;
initiate booting of the access domain in response to a successful authentication of the software image associated with the access domain; and
the access domain configured to:
inspect the resource group configuration in the protection unit by the access domain to determine if the resource group configuration is valid; and
lock the resource against access by the trust management engine if the resource group configuration in the protection unit is determined valid by the access domain.

9. The system of claim 8, wherein the agent comprises a high-level operating system.

10. The system of claim 9, wherein the access domain comprises a modem.

11. The system of claim 8, wherein the access domain comprises one or more bus masters.

12. The system of claim 11, wherein booting comprises a first bus master of the access domain initiating booting of a second bus master of the access domain after the first bus master completes booting, the second bus master booting independently of the trust management engine.

13. The system of claim 8, wherein:
the access domain is further configured to transmit a request to allocate an additional resource comprising an additional memory region to a high-level operating system ("HLOS");
the HLOS is configured to allocate the additional resource to the access domain; and
the access domain is configured to lock the additional resource against access by any entity other than the access domain.

14. The system of claim 13, wherein the access domain is further configured to:
unlock the additional resource against access by another entity; and
transmit to the HLOS an indication that the additional resource is free.

15. A system for resource access control in a system-on-chip ("Sort"), comprising:
means for allocating to an access domain a resource within the system-on-chip comprising a memory region and for loading a software image associated with the access domain into the memory region;
first means for locking the resource against access by any entity other than the access domain and the first means for locking by setting a resource group configuration in a protection unit, for authenticating the software image associated with the access domain, and for initiating booting of the access domain in response to a successful authentication of the software image associated with the access domain; the protection unit being coupled to and separate from the resource; the protection unit being coupled to a communication bus; the protection unit being separate from the processor; the protection unit comprising programmable logic for supporting the resource group configuration; and
second means for inspecting the resource group configuration in the protection unit to determine if the resource group configuration is valid, for locking the resource against access by the trust management engine if the resource group configuration in the protection unit is determined valid by the second means.

16. The system of claim 15, wherein the means for allocating and loading comprises a high-level operating system.

17. The system of claim 16, wherein the means for allocating and loading comprises a modem.

18. The system of claim 15, wherein the means for allocating and loading comprises one or more bus masters.

19. The system of claim 18, wherein booting comprises a first bus master of the access domain initiating booting of a second bus master of the access domain after the first bus master completes booting, the second bus master booting independently of the trust management engine.

20. The system of claim 15, wherein:
the means for allocating and loading further comprises means for transmitting a request to allocate an additional resource comprising an additional memory region and means for locking the additional resource against access by any entity other than the means for allocating and loading.

21. The system of claim 20, wherein:
the means for allocating and loading further comprises means for unlocking the additional resource against access by another entity and means for providing an indication that the additional resource is free.

22. A computer program product for resource access control in a system-on-chip ("SoC"), the computer program product comprising a non-transitory computer-readable medium having stored thereon instructions that when executed on a processor of the SoC control a method comprising:
allocating to an access domain, by an agent executing on the processor, a resource within the system-on-chip comprising a memory region;
loading, by the agent, a software image associated with the access domain into the memory region;
locking, by a trust management engine, the resource against access by any entity other than the access domain and the trust management engine by setting a resource group configuration in a protection unit, the protection unit being coupled to and separate from the resource; the protection unit being coupled to a communication bus; the protection unit being separate from the processor; the protection unit comprising programmable logic for supporting the resource group configuration;
authenticating, by the trust management engine, the software image associated with the access domain;
initiating booting of the access domain in response to a successful authentication of the software image associated with the access domain;
inspecting the resource group configuration in the protection unit by the access domain to determine if the resource group configuration is valid; and
the access domain locking the resource against access by the trust management engine if the resource group configuration in the protection unit is determined valid by the access domain.

23. The computer program product of claim 22, further comprising, after booting, the access domain locking the resource against access by the trust management engine.

24. The computer program product of claim 22, wherein the agent comprises a high-level operating system.

25. The computer program product of claim 22, wherein the access domain comprises one or more bus masters.

26. The computer program product of claim 22, further comprising:
the access domain transmitting a request to allocate an additional resource comprising an additional memory region to a high-level operating system ("HLOS");
allocating, by the HLOS, the additional resource to the access domain;
locking, by the access domain, the additional resource against access by any entity other than the access domain.

27. The computer program product of claim 26, further comprising:
unlocking, by the access domain, the additional resource against access by another entity; and
the access domain transmitting to the HLOS an indication that the additional resource is free.

* * * * *